Patented May 1, 1951

2,550,789

UNITED STATES PATENT OFFICE 2,550,789

PREPARATION OF SULFONAMIDO-DIPHENYLAMINES

Walter R. Edwards, Cumberland, Md., assignor to Celanese Corporation of America, a corporation of Delaware No Drawing. Application January 16, 1948, Serial No. 2,802

6 Claims. (Cl. 260—397.7)

This invention relates to the production of dyestuffs and relates, more particularly, to an improved process for the production of dyestuffs containing a sulfonamido-substituted diphenylamine nucleus.

An object of this invention is the provision of an improved process for the production of sulfonamido-diphenylamine dyestuffs whereby said dyestuffs may be obtained in increased yields.

Another object of this invention is to provide an improved process for the production of diphenylamine dyestuffs by reacting a phenylamine with a sulfonamido-substituted benzene compound containing a nuclear halogen whereby the sulfonamido-diphenylamine product obtained possesses an improved physical structure.

Other objects of this invention will appear from the following detailed description.

In the production of diphenylamine dyestuffs containing a sulfonamido-substituted diphenylamine nucleus, which dyestuffs may also contain other nuclear substituents such as, for example, a nitro, alkoxy, alkyl, heterocyclic, amino or other auxochrome group affecting the shade of the final dyestuff, the reaction employed usually comprises condensing a substituted or unsubstituted phenylamine with a sulfonamido-substituted nuclearly halogenated benzene compound employing an aqueous reaction medium. When chlorine, for example, is the nuclear halogen substituent, hydrogen chloride is formed as a product of the condensation reaction. The presence of an acid binding agent in the reaction mixture capable of reacting with the acid formed has been found to be somewhat advantageous. Inorganic acid binding agents such as the alkali metal and alkaline earth metal carbonates and bicarbonates have been employed heretofore but the use of these acid binding agents appears to have an adverse effect upon the yield of the desired diphenylamine obtained since the presence of these inorganic acid binding agents favors the hydrolysis of the sulfonamido group. Furthermore, the diphenylamine dyestuffs formed under the conditions heretofore employed have a strong tendency to solidify in the reaction vessel when reaction is completed forming a hard and substantially solid cake which is not only difficult to remove from the reactor but which is also difficult to wash and dry after removal.

I have now found that the condensation of a phenylamine with a sulfonamido-substituted benzene compound containing a nuclear halogen to yield sulfonamido-substituted diphenylamine dyestuffs may be effected so that substantially improved yields are obtained if the condensation reaction is effected in an aqueous medium employing as the acid binding agent the alkali metal or alkaline earth metal salt of an organic acid. I have found that the use of said organic acid salts in place of the inorganic carbonates and bicarbonates heretofore employed minimizes the tendency of the sulfonamido group present to undergo hydrolysis and, consequently, a markedly improved yield of the desired diphenylamine is obtained. As example of the organic salts which we may employ as acid binding agents in said novel condensation reaction there may be mentioned sodium acetate, sodium formate, sodium propionate, potassium acetate, calcium acetate, potassium formate, calcium formate, calcium propionate and potassium propionate. These acid binding agents are preferably employed in a mol ratio of 1 to 2 mols for each mol of the sulfonamido compound employed in the reaction mixture.

I have also found that the marked tendency of the diphenylamine reaction product which is formed in accordance with the condensation reaction described to precipitate in the reaction vessel in the form of particles which agglomerate to form a solid mass or lump may be entirely eliminated by adding a surface active emulsifying agent to the reaction mixture when effecting said condensation reaction. Surprisingly enough, the presence of a surface active emulsifying agent in the reaction mixture causes the diphenylamine reaction product to be precipitated in the form of discrete, easily filterable crystals entirely free of any tendency to agglomerate. Thus, because of the improved crystalline form in which the diphenylamine product is obtained, the same may easily be removed from the reactor, and, after removal, may easily be subjected to any necessary washing or drying operations to render the product suitable for dyeing operations. As examples of suitable surface active emulsifying agents which may be employed in accordance with our novel process there may be mentioned anionic surface active agents comprising sulfated long chain aliphatic alcohols, such as sulfated lauryl alcohol, sodium alkyl aryl sulfonates in which the alkyl group contains from 12 to 18 carbon atoms, sulfonated castor oil, the dialkyl esters of the sodium salt of sulfonated succinic acid, i. e., the diamyl, dibutyl, dihexyl and dioctyl sodium salts of sulfosuccinic acid, and the like. Preferably, we employ said surface active emulsifying agents in an amount of from 0.02 to 5.0% on the weight of the water in the aqueous reaction medium. Optimum results are obtained employing sulfated lauryl alcohol in an amount of 0.1 to 0.3% by weight.

As examples of substituted and unsubstituted phenylamines which may be reacted with 3-nitro-4-chlor-benzene-sulfonamide or other sulfonamide in forming said diphenylamine compounds there may be mentioned aniline, o-anisidine, p-anisidine, o-toluidine, p-toluidine, o-phenetidine, p-phenetidine, o-chlor-aniline, p-chlor-aniline, p-amino-phenol, p-amino-methyl-acetanilide, p-hydroxyethoxy-aniline, p-amino-acetanilide, p-aceto-aniline, 2,5-dimethoxy-aniline, 2-ethoxy-5-acetylamino-aniline, p-phenoxy-aniline, 2,4,6-trimethyl - aniline, m - trifluoromethyl - aniline, 2,6-dimethoxy-aniline and p-butoxy-aniline.

Thus, diphenylamine compounds which may be prepared in accordance with the novel process of my invention are, for example, 2-nitro-4-sulfonamido - diphenylamine, 2-nitro-4-sulfonamido-4'-methoxy-diphenylamine, 2-nitro-4-sulfonamido-4'-methyl-diphenylamine, 2-nitro-4-sulfonamido-4'-ethoxy - diphenylamine, 2-nitro-4-sulfonamido-4-chloro-diphenylamine, 2-nitro-4-sulfonamido-4'-hydroxy-diphenylamine, 2-nitro-4-sulfonamido - 2' - ethoxy-diphenylamine, 2-nitro-4-sulfonamido-4'-methylacetamino - diphenylamine, 2-nitro - 4 - sulfontetrahydrofurfurylamido-diphenylamine, 2-nitro-4-sulfonamido-4'-(β - hydroxyethoxy) - diphenylamine, 2-nitro-4-sulfonamido-4'-acetamino-diphenylamine, 2-nitro-4-sulfonamido-2'-methoxy-diphenylamine, 2-nitro-4-sulfonamido-2'-chlor-diphenylamine, 2-nitro-4-sulfonamido-4'-aceto-diphenylamine, 2-nitro-4-sulfonamido-2',5'-dimethoxy-diphenylamine, 2-nitro-4-sulfonamido-2'-ethoxy-5'-acetamino-diphenylamine, 2-nitro-4-sulfonamido-4'-phenoxy-diphenylamine, 2-nitro-4-sulfonamido-2',4',6'-trimethyl - diphenylamine, 2-nitro-4-sulfonamido-3'-trifluoromethyl - diphenylamine, 2-nitro-4-sulfonamido-2',6'-dimethoxy-diphenylamine, 2-nitro-4-sulfonamido-2'-methyl-diphenylamine, 2 - nitro - 4 - sulfonamido-4'-butoxy-diphenylamine.

In effecting said condensation reaction, from 1.0 to 2.0 and, preferably, about 1.2 mols of the substituted or unsubstituted phenylamine are employed for each mol of the halogenated sulfonamido-substituted benzene.

In order further to illustrate my invention, but without being limited thereto, the following examples are given:

Example I

Into an iron reaction vessel equipped with a suitable agitator are charged the following reactants in the order given:

| | Parts by weight |
|---|---|
| Water | 700 |
| Sodium acetate (anhydrous) | 24.3 |
| Sulfated lauryl alcohol | 0.7 |
| Aniline | 33.1 |
| 3-nitro-4-chlor-benzene-sulfonamide | 70.0 |

The charge is heated to reflux temperature, i. e. 99 to 102° C., and maintained at this temperature for about 8 hours with constant agitation. The melting point of the reaction product is taken at intervals and when the same is found to be above 165° C. the reaction is complete. The reaction mixture is then cooled to 40° C. or less and filtered. The filter cake obtained is then washed on the filter press with 300 parts by weight of water at about 20° C., the wash water being combined with the filtrate. The filtrate is stored for reuse in subsequent operations. The press cake of 2-nitro-4-sulfonamido-diphenylamine is dried and a yield of 76 parts by weight of dried dyestuff or 87% of theoretical is obtained. When sodium carbonate is employed as the acid binding agent a considerable degree of hydrolysis of the sulfonamido group takes place and a yield of only about 60% is obtained.

Example II

Into an iron reaction vessel equipped with a suitable agitator are charged the following reactants in the order given:

| | Parts by weight |
|---|---|
| Water | 700 |
| Sodium acetate (anhydrous) | 24.3 |
| Sulfated lauryl alcohol | 0.7 |
| P-anisidine | 43.7 |
| 3-nitro-4-chlor-benzene-sulfonamide | 70.0 |

The charge is heated to reflux temperature, i. e. 99 to 102° C., and maintained at this temperature for about 6 hours with constant agitation. The melting point of the reaction product is taken at intervals and when the same is found to be above 213° C. the reaction is complete. The reaction mixture is then cooled to 40° C. or less and filtered. The filter cake is washed on the filter press with 300 parts by weight of water at about 20° C., the wash water being combined with the filtrate. The filtrate is stored for reuse in subsequent operations. The press cake of 2-nitro - 4 - sulfonamido-4'-methoxy-diphenylamine is dried and a yield of 84.6 parts by weight of dye or 87% of theoretical is obtained. When sodium carbonate is employed as the acid binding agent a considerable degree of hydrolysis of the sulfonamido group takes place and a yield of only about 60% is obtained.

It is to be understood that the foregoing detailed description is given merely by way of illustration and that many variations may be made therein without departing from the spirit of my invention.

Having described my invention, what I desire to secure by Letters Patent is:

1. In a process for the preparation of a diphenylamine compound wherein a primary phenylamine is condensed with a monocyclic benzene compound having a nuclear sulfonamido group and containing a nuclearly substituted halogen as the sole reactive group in an aqueous medium and in the presence of an acid binding agent, the step which comprises employing a salt selected from the group consisting of the alkali metal and alkaline earth metal salts of a saturated lower aliphatic monocarboxylic organic acid as the acid binding agent and having a surface active agent, selected from the group consisting of sulfate and sulfonate organic groups, present in the aqueous reaction medium.

2. In a process for the preparation of a diphenylamine compound wherein a primary phenylamine is condensed with a monocyclic benzene compound having a nuclear sulfonamido group and containing a nuclearly substituted halogen as the sole reactive group and in an aqueous medium and in the presence of an acid binding agent, the step which comprises employing a salt selected from the group consisting of the alkali metal and alkaline earth metal salts of a saturated lower aliphatic monocarboxylic organic acid as the acid binding agent in an amount of from 1 to 2 mols for each mol of the sulfonamido compound employed and having a surface active agent, selected from the group consisting of sulfate and sulfonate organic compounds, in the aqueous reaction medium.

3. In a process for the preparation of 2-nitro-4-sulfonamido-diphenylamine wherein aniline is condensed with 3-nitro-4-chlor-benzene sulfonamide in an aqueous medium and in the presence of an acid binding agent, the step which comprises effecting the condensation with sodium acetate as the acid binding agent and having sulfated lauryl alcohol present in the aqueous reaction medium.

4. In a process for the preparation of 2-nitro-4 - sulfonamido - 4' - methoxy - diphenylamine wherein anisidine is condensed with 3-nitro-4-chlor-benzene sulfonamide in an aqueous medium and in the presence of an acid binding agent, the step which comprises effecting the condensation with sodium acetate as the acid binding agent and having sulfated lauryl alcohol present in the aqueous reaction medium.

5. In a process for the preparation of 2-nitro-4-sulfonamido-diphenylamine wherein aniline is condensed with 3-nitro-4-chlor-benzene sulfonamide in an aqueous medium and in the presence of an acid binding agent, the step which comprises effecting the reaction with sodium acetate as the acid binding agent in an amount of from 1 to 2 mols for each mol of 3-nitro-4-chlor-benzene sulfonamide employed and having sulfated lauryl alcohol present in the aqueous reaction medium.

6. In a process for the preparation of 2-nitro-4 - sulfonamido - 4' - methoxy - diphenylamine wherein anisidine is condensed with 3-nitro-4-chlor-benzene sulfonamide in an aqueous medium and in the presence of an acid binding agent, the step which comprises effecting the reaction with sodium acetate as the acid binding agent in an amount of from 1 to 2 mols for each mol of 3-nitro-4-chlor-benzene sulfonamide employed and having sulfated lauryl alcohol present in the aqueous reaction medium.

WALTER R. EDWARDS.

REFERENCES CITED

The following references are of record in the file of this patent:

UNITED STATES PATENTS

| Number | Name | Date |
|---|---|---|
| 1,709,292 | Wagner | Apr. 16, 1929 |
| 2,080,704 | Fischer et al. | May 18, 1937 |
| 2,099,773 | Somers | Nov. 23, 1937 |
| 2,195,067 | Weinand et al. | Mar. 26, 1940 |
| 2,221,131 | Fischer et al. | Nov. 12, 1940 |
| 2,394,279 | Weiss et al. | Feb. 5, 1946 |
| 2,422,029 | McNally et al. | June 10, 1947 |